United States Patent [19]
Childers et al.

[11] Patent Number: 5,579,297
[45] Date of Patent: Nov. 26, 1996

[54] OPTICAL DATA STORAGE CARTRIDGE HAVING A DUAL SHUTTER CONFIGURATION AND SHUTTER HINGE DEVICE

[75] Inventors: Edwin R. Childers, Tucson, Ariz.; Jon S. Drier, San Jose, Calif.; Michael Henry, Tucson, Ariz.

[73] Assignee: International Business Machines Corporation, New York, N.Y.

[21] Appl. No.: 425,685

[22] Filed: Apr. 19, 1995

Related U.S. Application Data

[63] Continuation of Ser. No. 145,258, Oct. 29, 1993.

[51] Int. Cl.$^6$ .................................................. G11B 23/03
[52] U.S. Cl. .......................................................... 369/291
[58] Field of Search ..................................... 369/289–291; 360/133; 206/309–313, 444; 229/68 R

[56] References Cited

U.S. PATENT DOCUMENTS

| | | | |
|---|---|---|---|
| D. 325,468 | 4/1992 | Ohba | D3/35 |
| 4,694,448 | 9/1987 | Tamaru et al. | 369/291 |
| 4,746,013 | 5/1988 | Suzuki et al. | 360/133 |
| 4,837,784 | 6/1989 | Yamamori | 369/291 |
| 4,908,817 | 3/1990 | Sandell et al. | 369/291 |
| 4,910,624 | 3/1990 | Peeters | 360/133 |
| 4,945,530 | 7/1990 | Sandell et al. | 369/291 |
| 5,073,889 | 12/1991 | Rayner | 369/291 |
| 5,077,625 | 12/1991 | Shiba et al. | 369/291 |
| 5,150,354 | 9/1992 | Iwata et al. | 369/291 |
| 5,208,802 | 5/1993 | Suzuki et al. | 369/289 |
| 5,268,808 | 12/1993 | Childers | 369/291 |

FOREIGN PATENT DOCUMENTS

| | | |
|---|---|---|
| 2002481 | 11/1989 | Canada . |
| 0310795 | 9/1987 | European Pat. Off. . |
| 0288900 | 11/1988 | European Pat. Off. . |
| 0331389 | 8/1989 | European Pat. Off. . |
| 0391638 | 10/1990 | European Pat. Off. . |
| 0463575 | 6/1991 | European Pat. Off. . |
| 0554065 | 8/1993 | European Pat. Off. . |
| 0589611 | 3/1994 | European Pat. Off. . |
| 2591787 | 12/1985 | France . |
| 62-47893 | 3/1987 | Japan . |
| 2-121174 | 5/1990 | Japan . |
| 2-187973 | 7/1990 | Japan . |
| 2-37188 | 10/1990 | Japan . |
| 3-185689 | 8/1991 | Japan . |
| 90/05977 | 11/1988 | WIPO . |

OTHER PUBLICATIONS

"Sony MiniDisc System" Image Technology, Nov. 1992 No. 9, London, GB.
IBM TDB "Optical Disk Read Channel" Mar. 29, 1987, vol. 29 No. 10, Armonk, NY.

Primary Examiner—Robert S. Tupper
Assistant Examiner—Brian E. Miller
Attorney, Agent, or Firm—Douglas R. Millett

[57] ABSTRACT

A cartridge receives a variety of optical disks. The cartridge has a hinged lid for easy insertion and removal of the disks. A rotatable hub is mounted within the cartridge to receive the disks. An adaptor ring may be inserted into the cartridge to allow the cartridge to receive disks of different diameters. The cartridge is inserted into an optical drive which is able to operate with a variety of disks which may be inserted into the cartridge.

18 Claims, 10 Drawing Sheets

OPTICAL DATA STORAGE CARTRIDGE HAVING A DUAL SHUTTER CONFIGURATION AND SHUTTER HINGE DEVICE

This is a continuation of U.S. patent application Ser. No. 08/145,258, filed Oct. 29, 1993.

BACKGROUND OF THE INVENTION

1. Field of the Invention

The present invention relates generally to optical disk cartridge systems and more specifically to a cartridge which allows the removal of optical disks from the cartridge.

2. Description of the Prior Art

Optical data storage systems, such as optical disk drives, use laser beams to record and read data to and from optical data storage disks. The optical disks are typically packaged in a cartridge in order to protect the disk and allow easy insertion and removal from the disk drive.

Examples of optical disk cartridges include U.S. Pat. No. 5,073,889, issued Dec. 17, 1991; U.S. Pat. No. 4,945,530, issued Jul. 31, 1990; U.S. Pat. No. 4,908,817, issued Mar. 13, 1990; European Patent Application 463575, published Jan. 2, 1992; Canadian Patent Application 2,002,481, published May 11, 1990; Japanese Patent Application 03-185689, published Aug. 13, 1991; Japanese Patent Application 02-187973, published Jul. 24, 1990; Japanese Patent Application 02-121174, published May 9, 1990; and Japanese Patent Application 62-47893, published Mar. 2, 1987.

There are a number of different types of optical disks. Compact disks (CD) or compact disk read only memory (CD-ROM) contain information encoded as permanent embedded pits or marks in the disks. These disks may not be written upon by the user. They are typically 120 millimeters in diameter and do not have an integral hub at the center.

Writable disks include write once read many (WORM) and magneto-optical (MO). These disks allow the user to both record and read data to and from the disk. These disks are typically 130 millimeters in diameter and have a central, integral hub. Due to the differences in types of optical disks, it has not been possible for one drive to accommodate all types of disks. Instead, each has its own unique cartridge which may only be used in an optical drive specifically designed for use with that cartridge. This places limitations on the users ability to use a variety of disks. Also, the requirement that each optical disk have its own unique cartridge adds to the cost of the optical storage system.

What is needed is an inexpensive optical disk cartridge system which will receive various types of optical disks and allow them to be played in a single optical disk drive.

SUMMARY OF THE INVENTION

Briefly, in a preferred embodiment, the present invention comprises a cartridge having a housing member which has a substantially cylindrical inner chamber sized to receive an optical disk. An adjustment ring may be inserted into the inner chamber to allow different sized disks to be used. The housing member further includes a hinge mounted lid which allows disks to be inserted and removed from the inner chamber. The cartridge further includes a rotatable hub attached to a side of the inner chamber. The hub is sized to receive the optical disks. The cartridge also includes a spindle aperture to allow a spindle to engage and rotate the hub. Optical apertures are also provided to allow optical communication between the drive and the disk.

The cartridge is inserted into an optical disk drive. The disk drive is able to record and/or read data to and from the different types of disks which may be interchanged within the cartridge.

For a fuller understanding of the nature and advantages of the present invention, reference should be made to the following detailed description taken in conjunction with the accompanying drawings.

DESCRIPTION OF THE PREFERRED EMBODIMENTS

Figure 1:
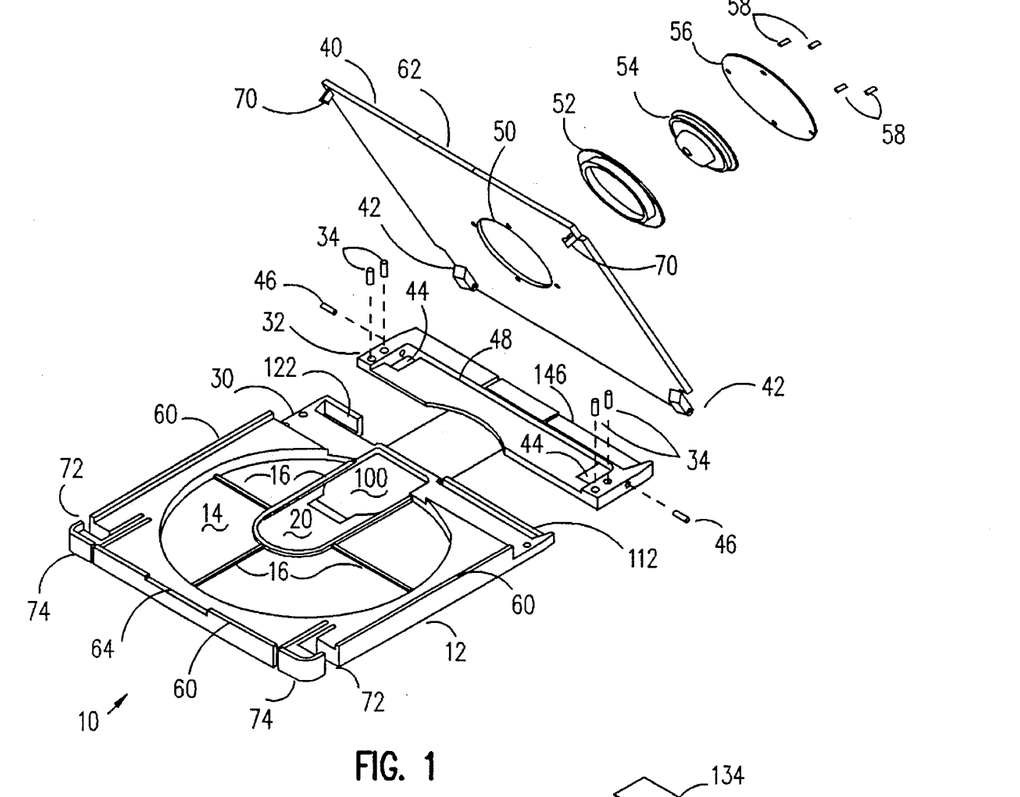
FIG. 1 is a top, exploded view of a cartridge of the present invention.
Figure 2:
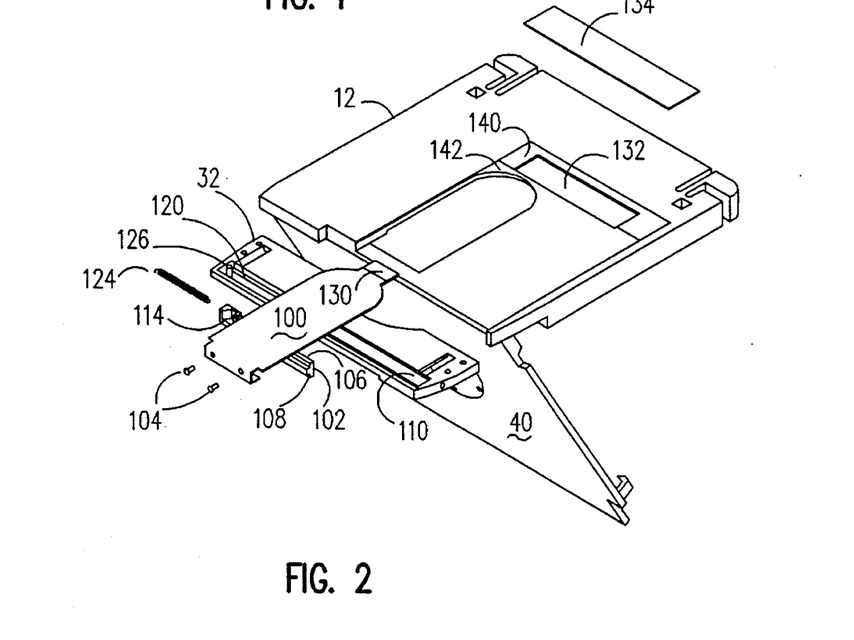
FIG. 2 is a bottom, exploded view of the cartridge of FIG. 1.

FIGS. 1 and 2 show a top and bottom, exploded view, respectively, of an optical disk cartridge of the present invention and is designated by the general reference number 10. A base member 12 has an inner chamber 14 which is substantially cylindrical in shape. Chamber 14 is sized to receive a large diameter optical disk. A plurality of ridges 16 run along the floor of chamber 14 and are used to support the optical disk. The floor of chamber 14 also has an aperture 20 which is used to provide access for a spindle to drive the optical disk and for optical communication with a laser of a disk drive. Base 12 has a ledge portion 30 which is sized to receive a nose member 32. Nose member 32 is attached to base 12 by means of a plurality of screws 34.

A lid member 40 is sized to cover the base member 12 and nose 32 and enclose inner chamber 14. Lid 40 has a pair of hinge members 42. Nose 32 has a pair of slots 44 which are sized to receive hinge members 42. A pair of shaft pins 46 each pass through nose member 32 and are received by one of the hinge members 42. The pins are pressure fitted or glued in place. Lid 40 is thereby hinge mounted to nose 32 and may be opened and closed. Nose 32 has a groove 48 which provides clearance for the back edge of lid 40 when lid 40 is opened.

Lid 40 has a circular central hub aperture 50. Hub aperture 50 is positioned such that its center point is along the central axis of the cylindrical chamber 14 when the lid 40 is closed. Aperture 50 will then be positioned over aperture 20. Hub aperture 50 receives a hub retaining ring 52. Ring 52 receives a hub member 54. A retaining plate 56 overlies retaining ring 52 and the two elements are attached to lid 40 by a plurality of screws 58. Alternatively, a cement may be used to attach ring 52 and plate 56.

Base 12 has a flange 60 along its top surface which is sized to receive lid 40 when lid 40 is in a closed position. Lid 40 has a tab member 62 which is received by a gap 64 in flange 60. Tab 62 has a finger hole for opening lid 40.

Lid 40 has a pair of latching hook members 70 which are received in slots 72 of base 12. The hooks 70 latch to a pair of biased button members 74. Hooks 70 are released by pressing buttons 74 inward toward one another. The lid 40 may then be opened.

Aperture 20 is covered by a shutter 100. Shutter 100 is attached to a slide member 102 by a plurality of screws 104. Slide 102 has a flange 106 and a flange 108. Nose 32 has a slot 110 which receives flange 108. Base 12 has a slot 112 which receives flange 106. Slide 102 is sandwiched between members 12 and 32 and slides along slots 110 and 112. Slide 102 has a notch 114. Notch 114 provides an interface for a shutter device in an optical disk drive system which is used to open the shutter 100 when cartridge 10 is placed in the disk drive.

Nose 32 has a spring slot 120 and base 12 has a spring slot 122. Slots 120 and 122 contain a spring 124. A first end of spring 124 is attached to a post 126 of nose 32 and a second end of spring 124 is attached to slide member 102. Spring 124 provides a bias to keep shutter 100 in a closed position.

An end tab 130 of shutter 100 is bent to a lower elevation and is received in a retaining well 132 of base 12. A retaining strip 134 is glued over well 132 and traps tab 130 in place. Base 12 has a first counter sunk portion 140 to receive plate 134 and a second counter sunk portion 142 which accommodates the sliding shutter 100. Nose 32 has a counter sunk portion 146 to also accommodate the sliding shutter 100.

In a preferred embodiment, base 12, nose 32, lid 40 and slide 102 are all made of a resilient plastic such as polycarbonate. Ring 52, hub 54, plate 56, shutter 100 and plate 134 are all preferably made of stainless steel.

Figure 3:
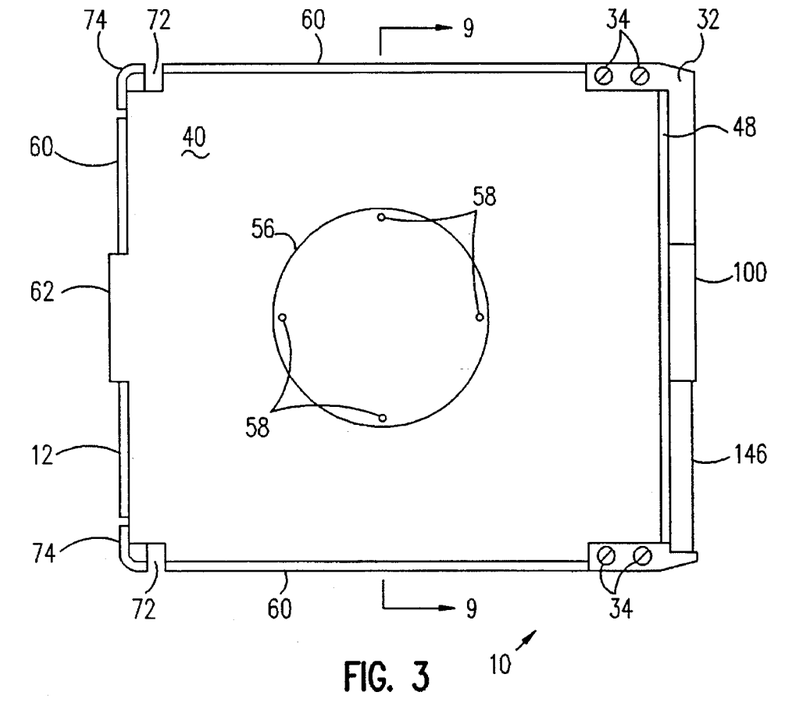
FIG. 3 is a top view of the cartridge.

FIG. 3 shows a top view of cartridge 10 with lid 40 in a closed position.

Figure 4:
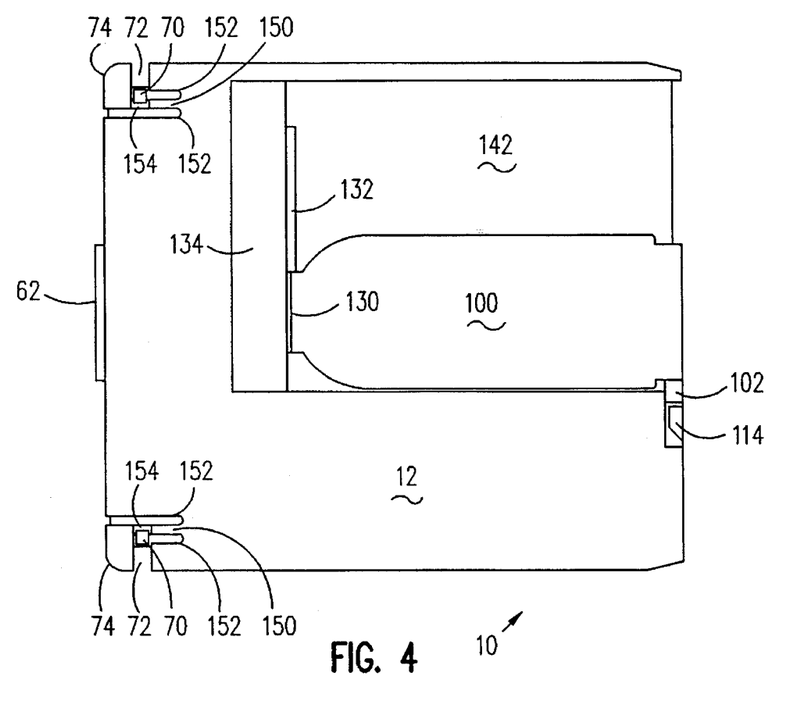
FIG. 4 is a bottom view of the cartridge.

FIG. 4 is a bottom view of cartridge 10 and shows shutter 100 in a closed position. Button 74 is connected to base 12 by a thin spring member 150 which is flanked by slots 152. Hook 70 engages a notch 154 in member 150.

Figure 5:
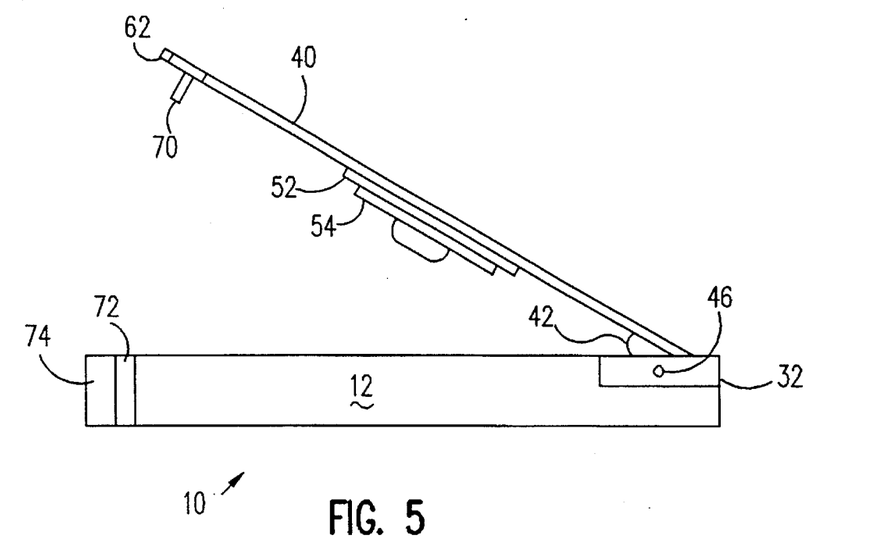
FIG. 5 is a side view of the cartridge.

FIG. 5 is a side view of cartridge 10 with lid 40 in an open position.

Figure 6:
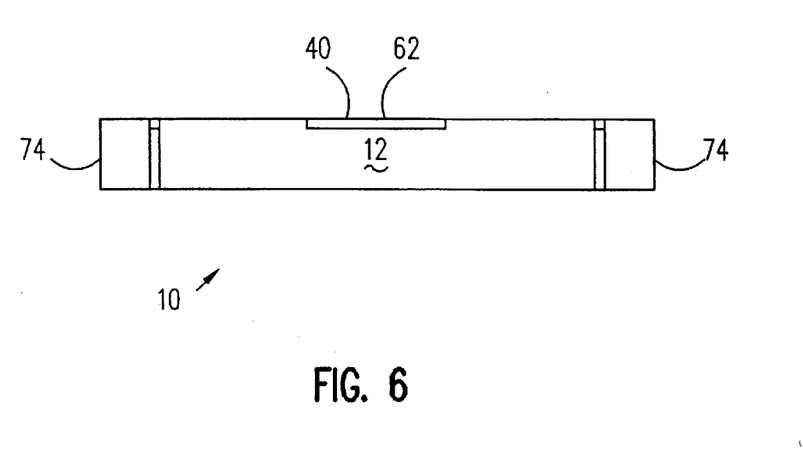
FIG. 6 is a front view of the cartridge.

FIG. 6 shows a front view of cartridge 10 with lid 40 in a closed position.

Figure 7:
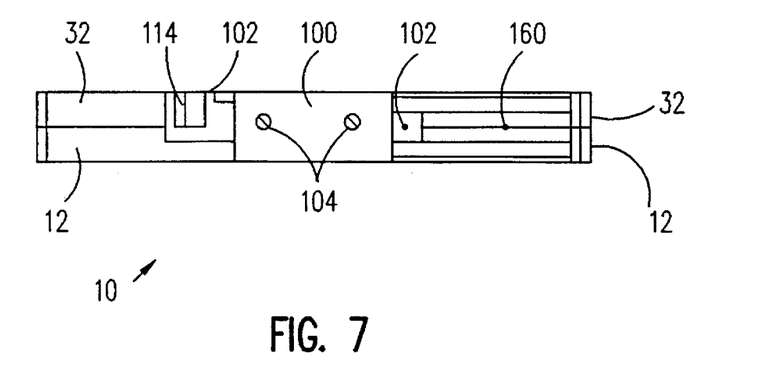
FIG. 7 is a back view of the cartridge.

FIG. 7 shows a back view of cartridge 10 with both lid 40 and shutter 100 in a closed position. It can be seen that slide 102 is trapped between nose 32 and base 12 and slides within a space 160 which is formed by slots 110 and 112.

Figure 8:
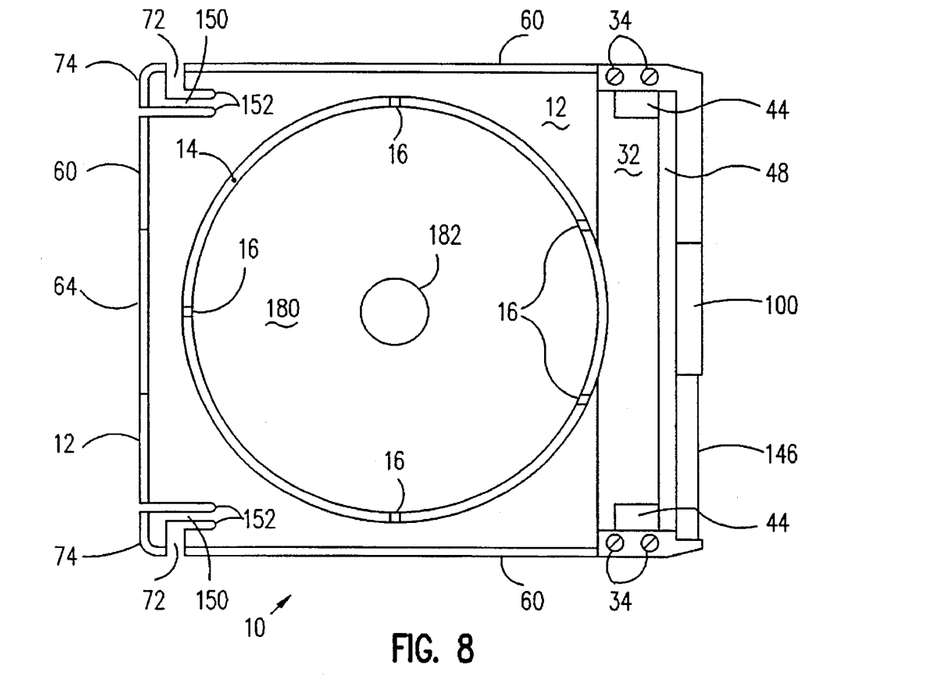
FIG. 8 is a top view of the open cartridge.

FIG. 8 shows a top view of cartridge 10 with lid 40 removed. A hubless optical disk 180 is placed within chamber 14 and rests on ridges 16. Disk 180 has a diameter of approximately 130 millimeters in a preferred embodiment and is a magneto-optical type of disk. Chamber 14 has a diameter sized to receive disk 180 without binding. In a preferred embodiment, chamber 14 has a diameter of approximately 134 millimeters. Disk 180 has a central circular aperture 182. Aperture 182 has a diameter of approximately 15 millimeters in a preferred embodiment.

Figure 9:
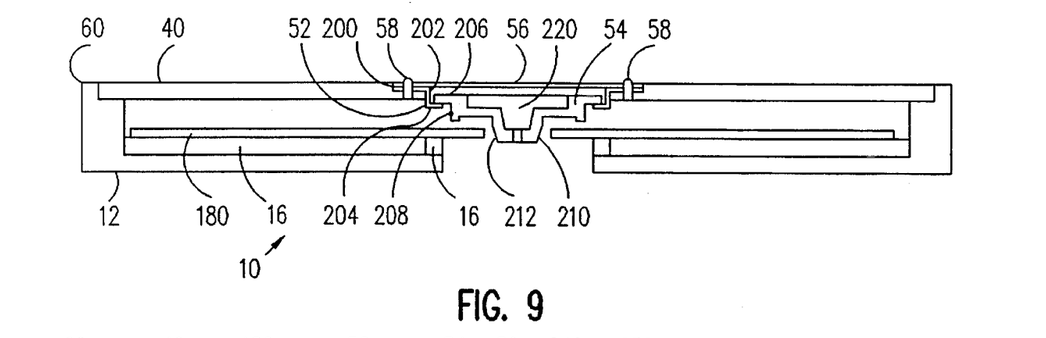
FIG. 9 is a cross sectional view of the cartridge.

FIG. 9 shows a cross sectional view of cartridge 10 as taken along line 9 of FIG. 3. Lid 40 has a counter sunk portion 200 which receives ring 52 and retaining plate 56. Ring 52 has an inner diameter wall 202 and a flange 204. Hub 54 has an outer flange 206 and an outer wall 208. The outer diameter of flange 206 is greater than the inner diameter of flange 204 and less than the inner diameter of wall 202. The diameter of wall 208 is less than the inner diameter of flange 204.

Hub 54 has a central cylindrical portion 210 which has an outer diameter sized to receive aperture 182 of disk 180. Portion 210 has a beveled edge 212 which is at an angle from the vertical in the range of 10–45 degrees and preferably approximately 15 degrees. The beveled edge 212 helps portion/210 engage aperture 182 when lid 40 is closed. Additionally, hub 54 is sized such that it has lateral linear movement relative to ring 52 in order to further help portion 210 engage aperture 182. In a preferred embodiment, this limited linear movement is in the range of 1–2 millimeters.

Hub 54 has a hollow center portion 220. This hollow portion is used to adjust the weight of hub 54. Weight members such as lead or plastic slugs may be cemented into portion 220 to adjust the weight as appropriate. In a preferred embodiment, the weight of hub 54 is such that the combined weight of hubless disk 180 and hub 54 is equal to or between the weight of a single sided hubbed International Standards Organization (ISO) standard 130 millimeter optical disk and the weight of a double sided hubbed ISO standard optical disk of the largest size which cartridge 10 may accommodate. In the preferred embodiment this size is 130 millimeters in diameter.

Figure 10:
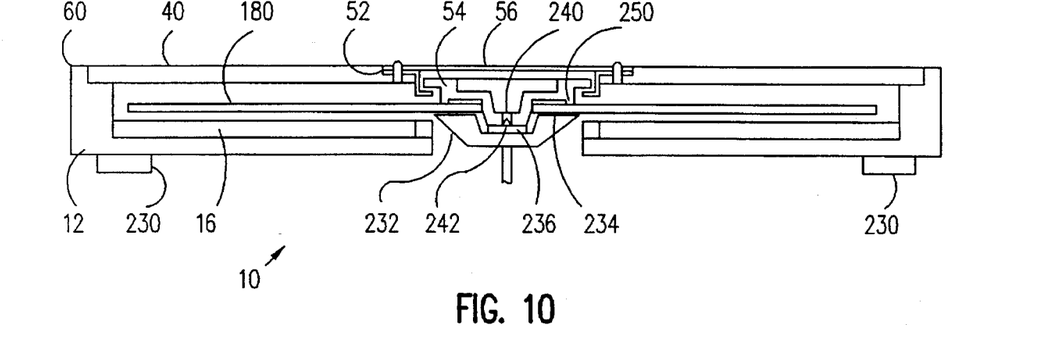
FIG. 10 is a cross sectional view of the cartridge when loaded onto a spindle.

FIG. 10 shows a cross sectional view of cartridge 10 when it is loaded into a disk drive. When cartridge 10 is placed in a disk drive, a cartridge loading device drops the cartridge 10 onto pads 230. At the same time, a shutter device opens shutter 100 such that a spindle clamp 232 passes through aperture 20. Spindle clamp 232 has a top surface 234 for engaging disk 180. Clamp 232 also has a magnet 236 which engages hub portion 210. Hub 54 has a central aperture 240 which receives a central pointed pin 242 of clamp 232. Hub 54 has an outer ridge 250 which engages disk 180. The magnetic force between magnet 236 and hub 54 traps disk 180 between ridge 250 and surface 234. As the cartridge 10 is loaded downward onto pads 230, disk 180 is lifted clear of the ridges 16 and is free to rotate. Also, hub 54 is sized such that it is able to move in a vertical linear direction relative to ring 52 such that hub 54 is lifted off of ring 52 and is also free to rotate. In a preferred embodiment, the vertical movement allowed is in the range 1–2 millimeters.

Figure 11:
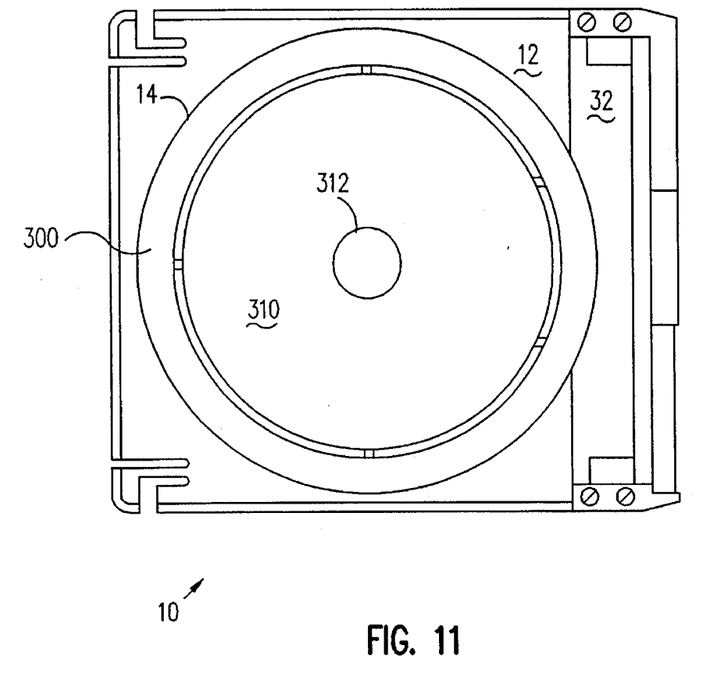
FIG. 11 is a top view of an alternative embodiment of the cartridge.

FIG. 11 shows a top view of cartridge 10 with lid 40 removed. An adaptor ring 300 is inserted into chamber 14. The outer diameter of ring 300 is sized to gently press fit within chamber 14. The inner diameter of ring 300 is sized to receive an optical disk 310 without binding. In a preferred embodiment, disk 310 is a 120 millimeter diameter compact disk. Disk 310 has a central circular aperture 312 which is also sized to receive hub 54 and is approximately 15 millimeters in diameter in the preferred embodiment.

Figure 12:
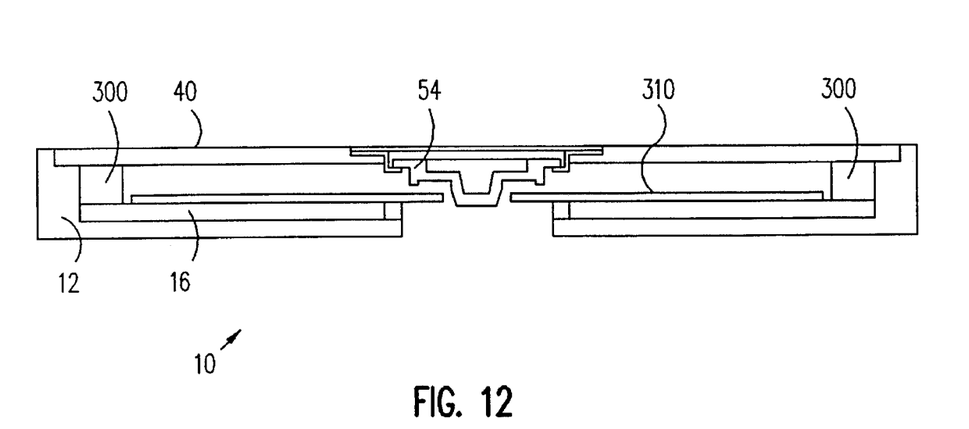
FIG. 12 is a cross sectional view of the cartridge of FIG. 11.

FIG. 12 shows a cross sectional view of cartridge 10 with adapter ring 300 and disk 310.

Figure 13:
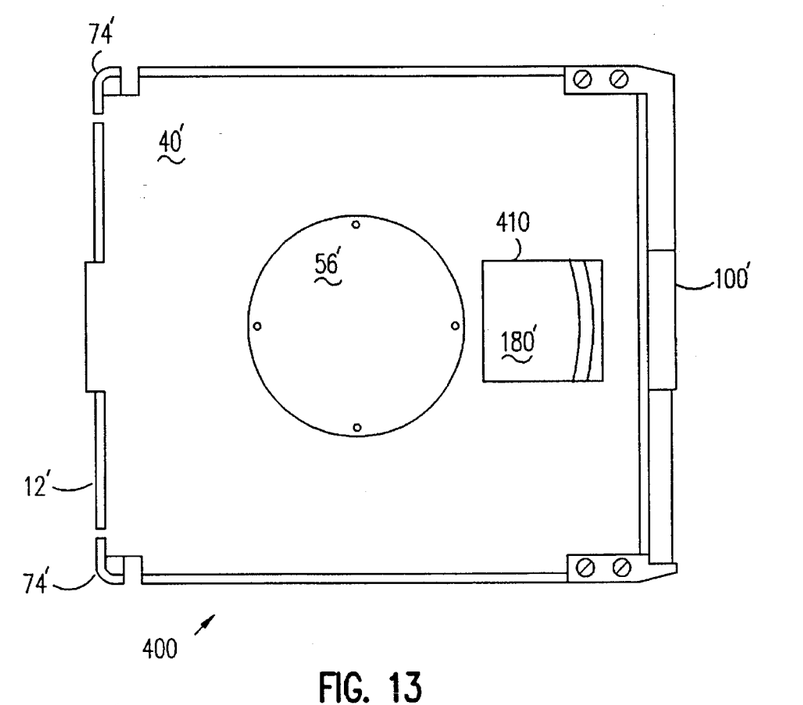
FIG. 13 is a top view of an alternative embodiment of the cartridge.

FIG. 13 shows a top view an alternative embodiment of the cartridge of the present invention and is designated by the general reference number 400. Elements of cartridge 400 which were similar to elements of cartridge 10 are designated by a prime number. Cartridge 400 is similar to cartridge 10 with the exception that a bias magnet aperture 410 has been added to lid 40'. Aperture 410 is positioned in lid 40 directly over aperture 20' of base 12'. Aperture 410 provides better access for a bias magnet in an optical drive. The bias magnet is used with magneto-optical disks.

Figure 14:
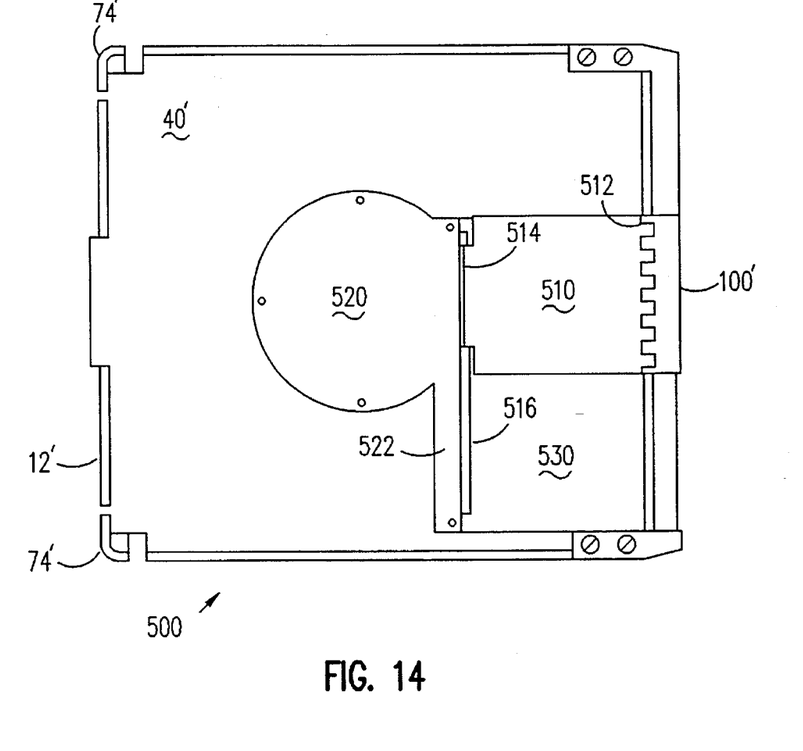
FIG. 14 is a top view of an alternative embodiment of the cartridge.

FIG. 14 shows a top view of an alternative embodiment of the cartridge of the present invention and is designated by the general reference number 500. Elements of cartridge 500 which are similar to elements of cartridge 10 are designated by a prime number. Cartridge 500 contains a bias magnet aperture similar to aperture 410 of cartridge 400. This aperture is covered by a shutter 510. Shutter 510 is attached to shutter 100' by a flexible hinge 512 which allows shutter 510 to move with lid 40' as lid 40' is opened. Shutter 510 has a tab section 514 which is bent to a different elevation such that it is received by a well 516 of lid 40'. The tab 514 then slides within the well 516. A cover plate 520 is similar to plate 56 of cartridge 10 with the addition of a strip 522 which covers well 516. Lid 40' has a counter sunk portion 530 which accommodates shutter 510. In operation, shutter 510 moves in concert with shutter 100.

Figure 15:
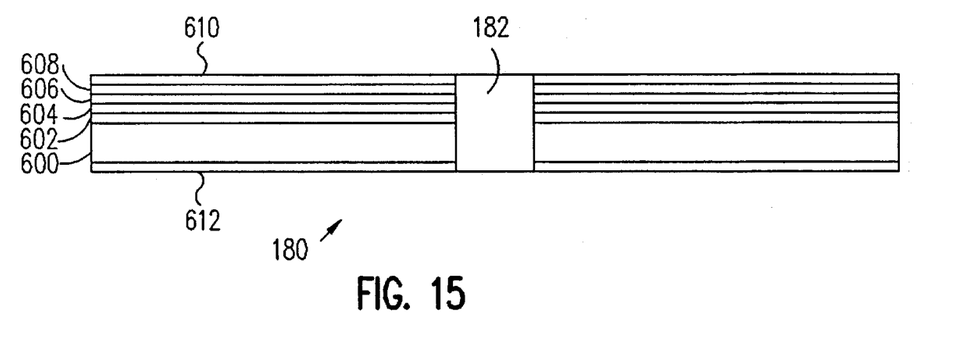
FIG. 15 is a cross sectional view of a single sided optical disk of the present invention.

FIG. 15 shows a cross sectional view of a single sided optical disk 180. Disk 180 has a substrate 600 which is made of polycarbonate and is approximately 1.2 millimeters thick. Substrate 600 has embedded spiral track grooves as is known in the art. A dielectric layer 602 is deposited onto substrate 600. Rewritable disks have a dielectric layer 602 which is deposited onto substrate 600. Dielectric layer 602 may be metallic nitrides and oxides and is 100–2000 Angstroms thick. Layer 604 may be a thermal-magneto-optical layer such as terbium iron cobalt (100–300 Angstroms thick). Another dielectric layer 606 is deposited onto layer 604 and is approximately 100–2000 Angstroms thick. Write Once Read Many or a WORM disk may have an active layer 604 such as bilayer composites containing tellurium and selenium 100–2000 Angstroms thick. A reflector layer 608 on both rewritable and WORM disks made of a reflective material such as aluminum or aluminum alloys is deposited onto layer 606 and is approximately 300–1500 Angstroms thick. A hard protective layer of ultra violet curable polymer 610 and 612 is then deposited over layer 608 and over the bottom surface of substrate 600 respectively to a thickness of 100–2000 Angstroms.

Figure 16:
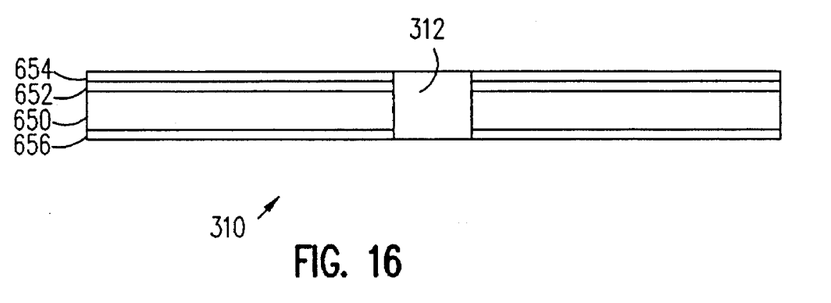
FIG. 16 is a cross sectional view of an alternative embodiment of a single sided disk.

FIG. 16 shows a cross sectional view of a single sided disk 310. Disk 310 is a CD or CD-ROM type of disk. Disk 300 has a substrate 650 of polycarbonate approximately 1.2 millimeters thick. Substrate 650 has spiral tracking grooves and embedded pits which contain prerecorded data as is known in the art. A reflector layer 652 of aluminum is deposited onto substrate 650 to a thickness of approximately 300–1500 Angstroms. A hard protective layer 654 and 656 made of ultraviolet curable polymer is deposited to a thickness of 100–2000 Angstrom on layer 652 and upon the surface of substrate 654, respectively.

Figure 17:
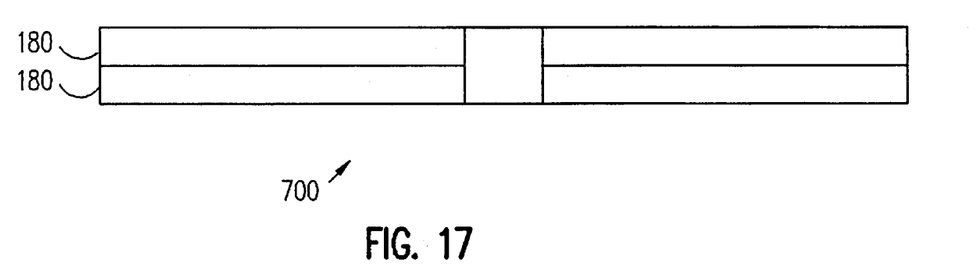
FIG. 17 is a cross sectional view of a double sided disk of the present invention.

FIG. 17 shows a cross sectional view of a double sided disk and is designated by the general reference number 700. Disk 700 is made by cementing two of disks 180 together with the protective layers 610 abutting one another. Two single sided disks 310 may be similarly glued together with layers 654 abutting to form the double sided hubless disks.

Figure 18:
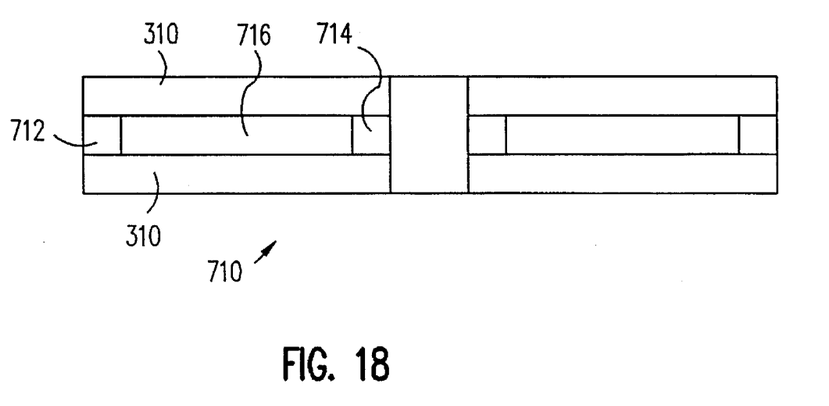
FIG. 18 is a cross sectional view of an alternative embodiment of a double sided disk of the present invention.

FIG. 18 shows a cross sectional view of an alternative embodiment of a double sided disk and is designated by the general reference number 710. A disk 310 is attached to a second disk 310 by means of an outer annular ring 712 and an inner annular ring 714. Rings 712 and 714 may be made of polycarbonate. Cement may be used to attach the members together. An air space 716 is formed between the disks 310. The layers 654 of each of the disks 310 face the air space 716. Disks 180 may also be used to form a double sided disk similar to disk 710 with layers 610 abutting the air space 716.

Figure 19:
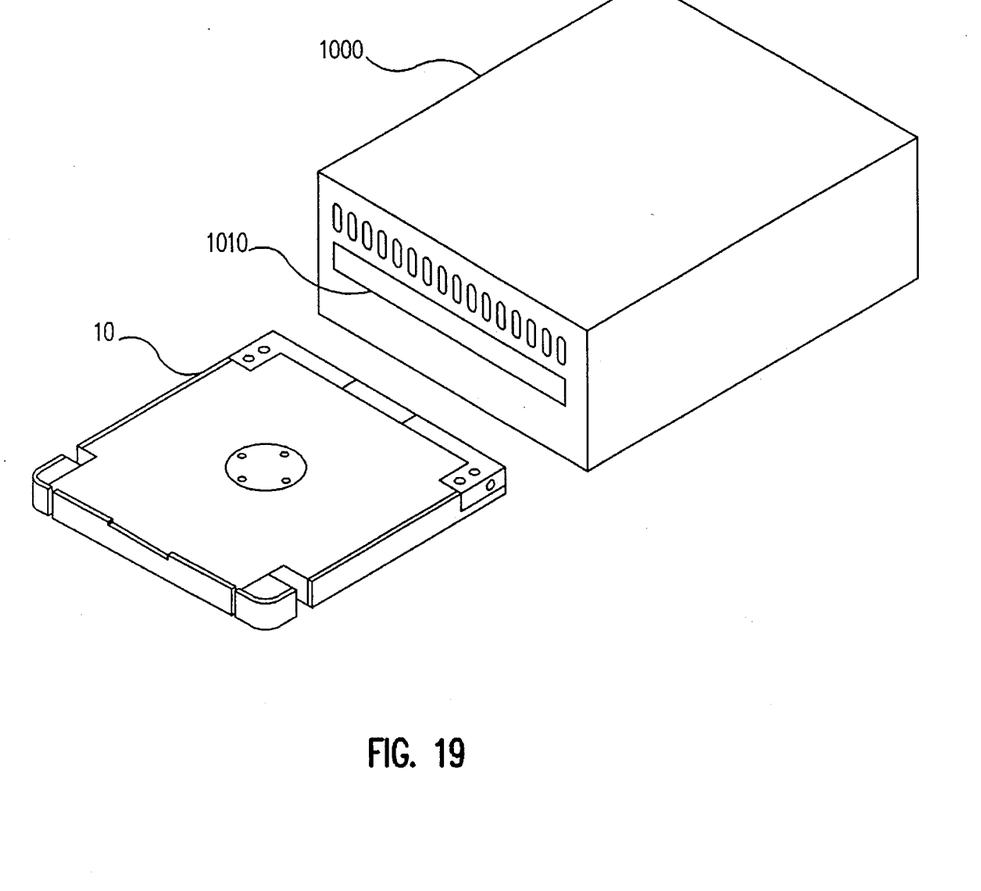
FIG. 19 is a perspective view of the cartridge and an optical disk drive of the present invention.

FIG. 19 shows a perspective view of cartridge 10 and a disk drive 1000 of the present invention. A slot 1010 is sized to receive cartridge 10.

Figure 20:
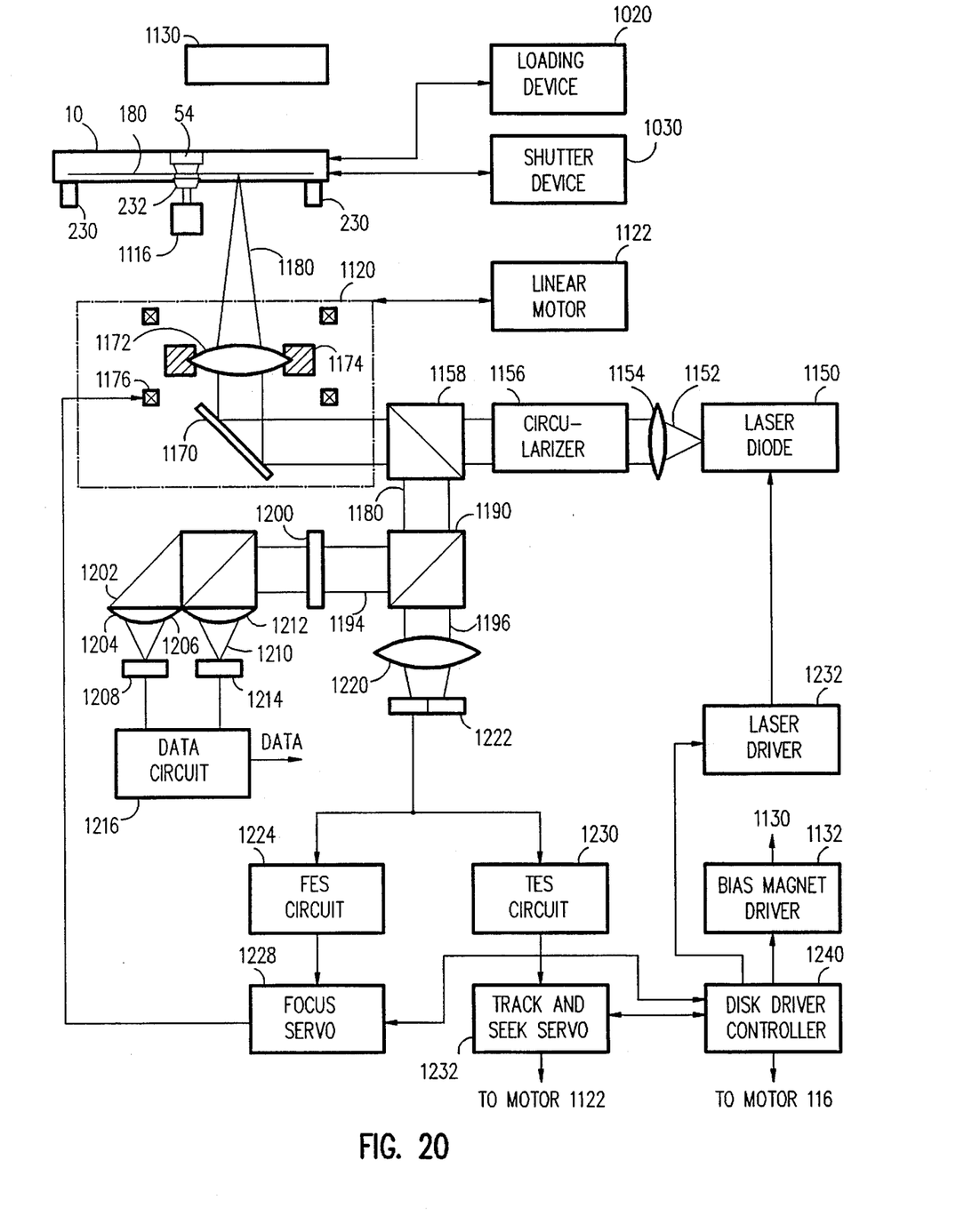
FIG. 20 is a schematic diagram of the system of FIG. 19.

FIG. 20 shows a schematic diagram of cartridge 10 and system 1000. When cartridge 10 is inserted into drive 1000, a loading device 1020 loads cartridge 10 down and onto pads 230 and spindle clamp 232 engages hub 54. At the same time, a shutter device 1030 engages notch 114 of shutter 100 and automatically opens shutter 100. Loading device 1020 and shutter device 1030 are well known in the art. Spindle clamp 232 is attached to a spindle motor 1116 which rotates disk 180. An optical head 1120 is positioned below disk 180. Head 1120 is moved in a radial direction relative to disk 180 by a linear motor 1122. A bias magnet 1130 is located above disk 180 and is connected to a bias magnet driver 1132.

A laser 1150 produces a polarized light beam 1152. Any type of laser may be used; however, laser 1150 is preferably a gallium-aluminum-arsenide laser diode which generates a light beam 1152 at approximately 780 nanometers in wavelength. Light beam 1152 is collimated by lens 1154 and circularized by a circularizer 1156. Circularizer 1156 is preferably a prism.

Beam 1152 passes through a beamsplitter 1158 to a mirror 1170. Mirror 1170 reflects beam 1152 toward a focusing lens 1172. Lens 1172 focuses beam 1152 onto disk 180. Lens 1172 is mounted in a lens holder 1174. Holder 1174 may be moved relative to disk 1180 by an actuator motor 1176. Mirror 1170, lens 1172, holder 1174 and motor 1176 are preferably located in the optical head 1120.

A light beam 1180 is reflected from the disk 180, passes through lens 1172 and is reflected by mirror 1170. A portion of light beam 1180 is then reflected by beamsplitter 1158 to a beamsplitter 1190. Beamsplitter 1190 divides the beam 1180 into a data beam 1194 and a servo beam 1196.

The data beam 1194 passes through a half wave plate 1200 to a polarizing beamsplitter 1202. Beamsplitter 1202 divides beam 1194 into two orthogonal polarization components. A first polarization component beam 1204 is focused by a lens 1206 to a data optical detector 1208. A second polarization component 1210 is focused by lens 1212 to a data optical detector 1214. A data circuit 1216 is connected to detectors 1208 and 1214 and generates a data signal representative of the pattern of marks recorded on disk 180.

Servo beam 1196 is focused by a lens 1220 onto a segmented optical detector 1222, such as a spot sized measuring detector as is known in the art. A focus error circuit 1224 is connected to detector 1222. A focus servo 1228, as is known in the art, is connected to focus error signal (FES) circuit 1224 and motor 1176. Servo 1228 controls motor 1176 to adjust the position of lens 1172 as appropriate in order to maintain proper focus. A tracking error signal circuit 1230 is connected to a detector 1222. A track and seek servo 1232, as is known in the art, is connected to tracking error signal (TES) circuit 1230 and motor 1122. Servo 1232 causes motor 1122 to adjust the position of head 1120 as appropriate. A laser drive 1234, as is known in the art is connected to laser 1150.

A disk drive controller 1240, as is known in the art, is connected to and provides overall control for servos 1228 and 1232, spindle motor 1116, laser driver 1232 and magnet driver 1132.

Figure 21:
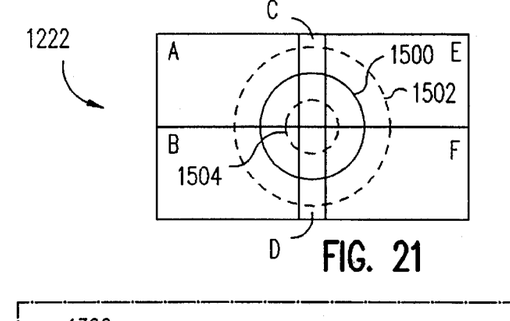
FIG. 21 is a top view of an optical sensor of FIG. 20.

FIG. 21 shows a top view of detector 1222. Detector 1222 is divided into six sections 1222A, B, C, D, E and F.

Figure 22:
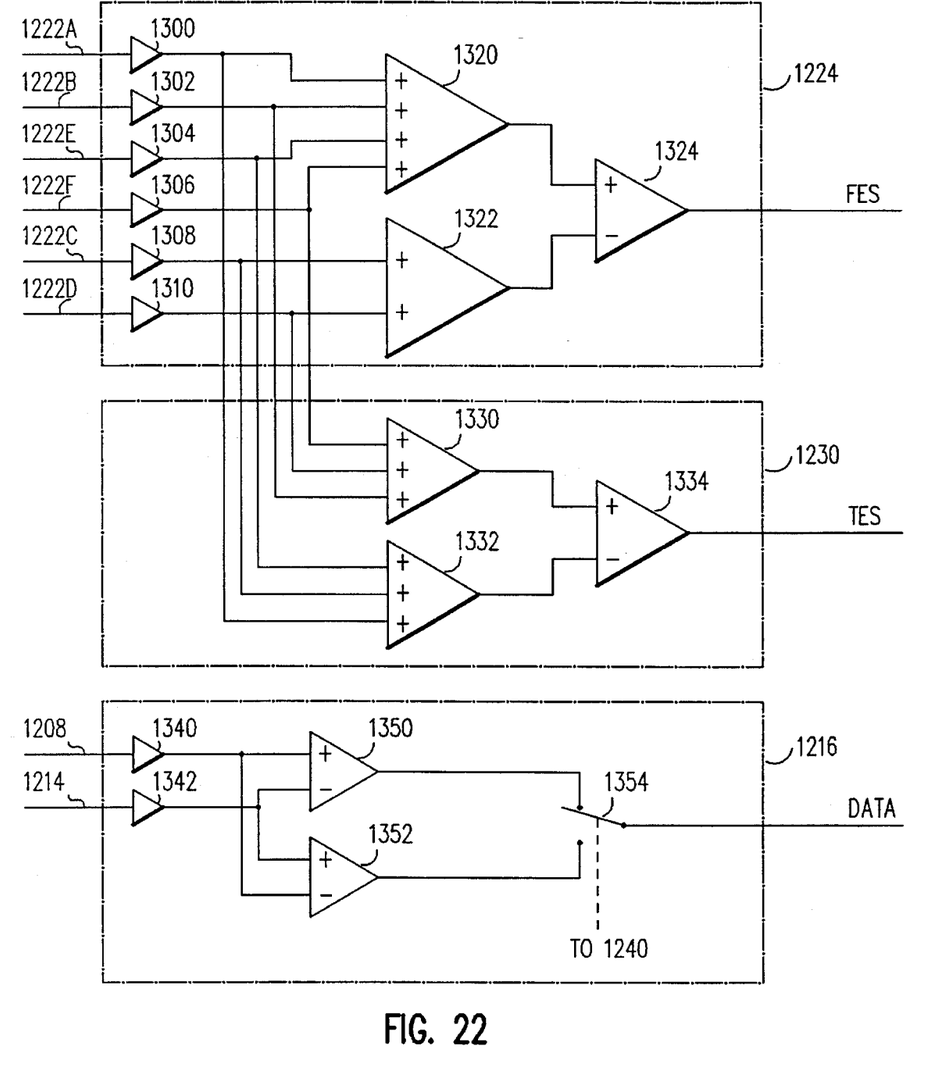
FIG. 22 is a circuit diagram of a portion of the system of FIG. 20.

FIG. 22 shows a circuit diagram of the TES circuit 1230, the FES circuit 1224 and the data circuit 1216. FES circuit 1224 comprises a plurality of amplifiers 1300, 1302, 1304, 1306, 1308, 1310 connected to detector sections 1222A, B, E, F, C and D, respectively. A summing amplifier 1320 is connected to amplifiers 1300–1306 and a summing amplifier 1322 is connected to amplifier 1308 and 1310. A differential amplifier 1324 is connected to summing amplifiers 1320 and 1322 and generates the FES.

TES circuit 1230 comprises a pair of summing amplifiers 1330 and 1332, and a differential amplifier 1334. Amplifier 1330 is connected to amplifiers 1302, 1306 and 1310; and the amplifier 1332 is connected to amplifiers 1300, 1304 and 1308. Differential amplifier 1334 is connected to amplifiers 1330 and 1332 and generates a TES.

Data circuit 1216 has a plurality of amplifiers 1340 and 1342 connected to detectors 1208 and 1214, respectively. A differential amplifier and a summing amplifier 1352 are connected to amplifiers 1340 and 1342. Differential amplifier 1350 generates a data signal for a polarization sensitive optical disk such as a magneto-optical disk, and summing amplifier 1352 generates a data signal for a reflectivity detecting disk such as a WORM, CD or CD-ROM disk. An electric switch 1354 is connected to controller 1240. Controller 1240 selects the type of data signal depending upon the type of disk which has been inserted into the drive. The information as to the type of disk may be provided to the controller by the user, or alternatively the controller may be programmed to select between the positions of switch 1354 until a successful read of the disk has taken place.

The advantages of the present invention may now be fully understood. Cartridge 10 and disk drive 1000 provide a way to use different types of optical disks in a single system. Cartridge 10 with adapter ring 300 and hub 54 are able-to receive various types of hubless optical disks such as CD, CD-ROM, WORM and magneto-optic. The disks may be single or double sided. Cartridge 10 is then received by drive 1000. Drive 1000 is able to operate with any of these different types of disks.

A further advantage to the user of the present invention is that only one optical cartridge is needed. Various hubless optical disks may be exchanged with a single cartridge of the present invention for use in the disk drive. This eliminates the cost of providing a cartridge for each optical disk. When not in use, the optical disks may be stored in inexpensive paper sleeves.

Although the preferred embodiment has been shown using specific sizes of optical disks, it should be understood that the cartridge of the present invention may be used with other sized disks. For example, smaller disks such as 3.5 inch and 2 inch diameter disks may be used. The adapter ring 300 may be sized to accommodate these different sized disks.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical data storage cartridge comprising:
   a base member having a substantially cylindrical interior portion for receiving a hubless optical disk through a disk opening and having a base member aperture for providing access for electromagnetic radiation to a first planar surface of the disk;
   a lid member for covering the disk opening, the lid member having a lid aperture for providing access for electromagnetic radiation to a second planar surface of the disk, the lid member mounted on a top side of the base member;
   a hinge device for attaching the lid member to the base member;
   a retractable base member shutter for covering the base member aperture mounted on a bottom side of the base member;
   a retractable lid shutter for covering the lid aperture mounted on the lid member, the lid shutter being on a top side of the cartridge opposite the bottom side of the base member;
   a shutter hinge attached to the lid shutter for connecting the lid shutter to the base member shutter, the shutter hinge allowing the lid shutter to move with the lid when the lid is open; and
   a rotatable hub member mounted to a surface of the lid member which faces the interior portion of the base member, the rotatable hub member being located opposite the base member aperture, the rotatable hub member for engaging the hubless optical disk.

2. The cartridge of claim 1, wherein the combined mass of the hub member and the hubless optical disk is in the range between the mass of an ISO standard single sided hubbed optical disk and an ISO standard double sided hubbed optical disk.

3. The cartridge of claim 1, wherein the rotatable hub member has a beveled edge for engaging a central aperture of the hubless optical disk.

4. The cartridge of claim 3, wherein the angle of the beveled edge is in the range of 10°–45°.

5. The cartridge of claim 1, wherein the hub is sized to receive an optical disk having a central aperture of approximately 15 mm in diameter.

6. The cartridge of claim 1, wherein the hubless optical disk is a CD disk.

7. The cartridge of claim 1, wherein the hubless optical disk is a CD-ROM disk.

8. The cartridge of claim 1, wherein the hubless optical disk is a WORM disk.

9. The cartridge of claim 1, wherein the hubless optical disk is a magneto-optical disk.

10. An optical data storage cartridge system comprising:
    an optical disk cartridge comprising a base member having a substantially cylindrical interior portion for receiving a hubless optical disk through a disk opening and having a base member aperture for providing access for electromagnetic radiation to a first planar surface of the disk, a lid member for covering the disk opening, the lid member mounted on a top side of the base member, the lid member having a lid aperture for providing access for electromagnetic radiation to a second planar surface of the disk, a hinge device for attaching the lid member to the base member, a retractable base member shutter mounted on a bottom side of the base member for covering the base member aperture, a retractable lid shutter mounted on the lid member for covering the lid aperture, the lid shutter being on a top side of the cartridge opposite the bottom side of the base member, a shutter hinge attached to the lid shutter for connecting the lid shutter to the base member shutter, the shutter hinge allowing the lid shutter to move with the lid when the lid is open, and a rotatable hub member mounted to a surface of the lid member which faces the interior portion of the base member, the rotatable hub member being located opposite the base member aperture, the rotatable hub member for engaging the hubless optical disk;

a device for receiving the optical disk cartridge;

a rotation device for engaging the hub and rotating the disk;

an electromagnetic radiation transmission device for transmitting a beam of electromagnetic radiation to the disk; and an electromagnetic radiation reception device for receiving an electromagnetic radiation beam from the disk and generating a data signal responsive thereto.

11. The system of claim 10, wherein the combined mass of the hub member and the hubless optical disk is in the range between the mass of an ISO standard single sided hubbed optical disk and an ISO standard double sided hubbed optical disk.

12. The system of claim 10, wherein the rotatable hub member has a beveled edge for engaging a central aperture of the hubless optical disk.

13. The system of claim 12, wherein the angle of the beveled edge is in the range of 10°–45°.

14. The system of claims 10, wherein the hub is sized to receive an optical disk having a central aperture of approximately 15 mm in diameter.

15. The system of claim 10, wherein the hubless optical disk is a CD disk.

16. The system of claim 10, wherein the hubless optical disk is a CD-ROM disk.

17. The system of claim 16, wherein the hubless optical disk is a WORM disk.

18. The system of claim 10, wherein the hubless optical disk is a magneto-optical disk.

* * * * *

UNITED STATES PATENT AND TRADEMARK OFFICE
CERTIFICATE OF CORRECTION

PATENT NO. : 5,579,297
DATED : Nov. 26, 1996
INVENTOR(S) : Childers et al.

It is certified that error appears in the above-indentified patent and that said Letters Patent is hereby corrected as shown below:

Column 10, line 21: change "16" to --10--.

Signed and Sealed this

Twenty-first Day of October 1997

Attest:

BRUCE LEHMAN

Attesting Officer

Commissioner of Patents and Trademarks